(12) United States Patent
Geary et al.

(10) Patent No.: US 6,899,946 B2  
(45) Date of Patent: May 31, 2005

(54) REUSABLE RESTRAINT FOR SECURING ARTICLES FOR SHIPPING AND/OR STORAGE

(75) Inventors: James R. Geary, Cochranton, PA (US); George L. Noey, Harmonsburg, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 82 days.

(21) Appl. No.: 09/955,777

(22) Filed: Sep. 19, 2001

(65) Prior Publication Data

US 2002/0094429 A1 Jul. 18, 2002

Related U.S. Application Data

(60) Provisional application No. 60/237,887, filed on Oct. 4, 2000.

(51) Int. Cl.[7] .............................. B32B 27/00; B32B 3/02
(52) U.S. Cl. ............................... 428/319.3; 428/318.4; 428/212; 428/217; 428/77; 428/81; 206/451; 206/453; 206/454; 206/449; 206/523; 206/586; 53/139.5; 53/139.6; 53/139.7
(58) Field of Search ......................... 428/318.6, 319.1, 428/319.3, 223, 212, 217, 77, 81; 206/454, 449, 451, 453, 523, 586; 53/139.5, 139.6, 139.7

(56) References Cited

U.S. PATENT DOCUMENTS

| | | | |
|---|---|---|---|
| 3,938,660 A | * | 2/1976 | Moehring .................... 206/451 |
| 3,939,978 A | | 2/1976 | Thomaswick ............... 206/454 |
| 4,014,435 A | | 3/1977 | Rowley et al. ............. 206/386 |
| 4,086,263 A | | 4/1978 | Rowley ....................... 206/454 |
| 4,225,043 A | | 9/1980 | Lastik ......................... 206/448 |
| 4,278,171 A | | 7/1981 | Millhoan .................... 206/451 |
| 4,320,836 A | | 3/1982 | Brown et al. ............... 206/451 |
| 4,467,922 A | | 8/1984 | Rowley ....................... 206/597 |
| 4,512,473 A | | 4/1985 | Thomaswick et al. ...... 206/454 |
| 4,812,093 A | * | 3/1989 | Millar, Jr. ................... 410/110 |
| 4,851,286 A | * | 7/1989 | Maurice ................... 428/316.6 |
| 5,024,865 A | * | 6/1991 | Insley ........................ 428/36.4 |
| 5,878,548 A | * | 3/1999 | Sauer et al. .................. 53/410 |

OTHER PUBLICATIONS

Geary, James R. et al., U.S. Appl. No. 60/237,887, filed Oct. 4, 2000.

* cited by examiner

*Primary Examiner*—Hai Vo  
(74) *Attorney, Agent, or Firm*—Andrew C. Siminerio

(57) ABSTRACT

A restraint for packaging glass sheets includes a first leg and a second leg, each leg having an inner surface configured to contact at least a portion of the glass sheets and an outer surface. The first and second legs define a vertex. The inner surfaces are made at least partly of a compressible material and the outer surfaces are made at least partly of a material having a hardness greater than that of the compressible material.

43 Claims, 3 Drawing Sheets

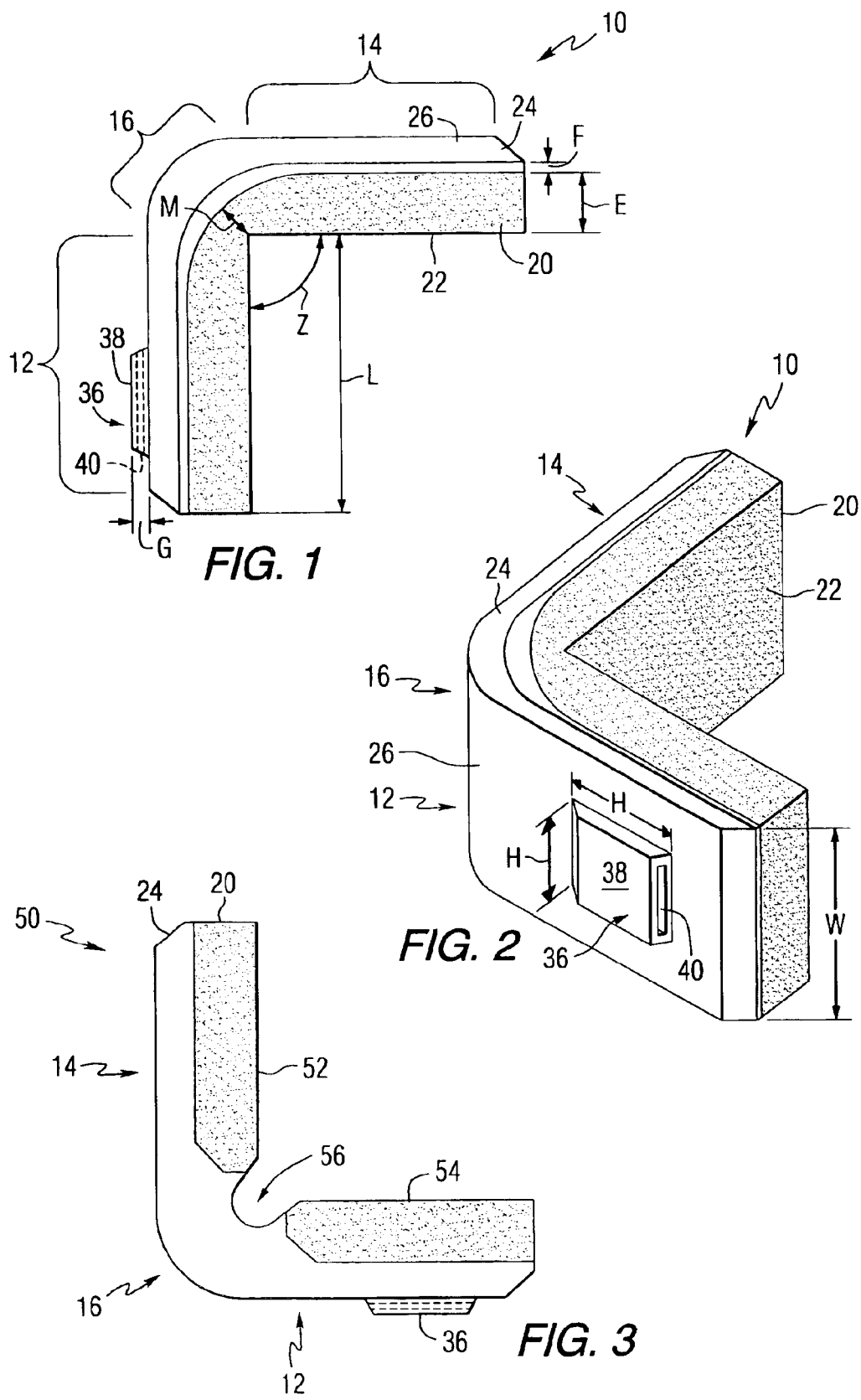

REUSABLE RESTRAINT FOR SECURING ARTICLES FOR SHIPPING AND/OR STORAGE

CROSS-REFERENCE TO RELATED APPLICATION

This application claims the benefits of U.S. Provisional Application Ser. No. 60/237,887 filed Oct. 4, 2000, which is herein incorporated by reference in its entirety.

BACKGROUND OF THE INVENTION

1. Field of the Invention

This invention relates generally to methods of packaging and shipping articles and, more particularly, to a device and method of using same for securing sheets on a rack for shipping or storage.

2. Technical Considerations

Frangible and non-frangible articles, such as flat glass sheets, automotive transparencies, architectural glass articles, wood or metal sheets, and the like, are typically shipped in bulk to fabricators in bins or racks. In order to prevent damage to the articles during shipping, the individual articles should be secured to prevent movement or jostling of the articles during shipping which could scratch or damage the articles.

In one commonly used method for shipping glass sheets, individual glass sheets are placed in a rack and secured in position by wooden lash boards which are held in place using banding material. An example of one such system is described in U.S. Pat. No. 4,014,435. Although the use of lash boards is acceptable, a drawback of this process is that when the package is received by the fabricator, the lash boards must be returned to the shipper, discarded or stored. This involves shipping, disposal, and/or inventory problems. Additionally, the wooden lash boards increase the overall weight of the loaded rack, which increases shipping costs.

As an alternative to using conventional lash boards, specially designed shipping containers have been developed. For example, U.S. Pat. No. 3,939,978 discloses a shipping container for a stack of flat glass sheets. The glass sheets are stacked onto a cut and scored sheet of fiberboard and pads are placed at each of the four corners of the stack. The fiberboard is then folded around the sheets to form a box. Examples of other such specially designed containers are disclosed in U.S. Pat. Nos. 4,512,473; 4,225,043; 4,278,171; 4,086,263; 4,320,836; and 4,467,922. While such specially designed shipping containers are acceptable and relieve some of the drawbacks of using conventional lash boards, these specially designed shipping containers can be more costly to manufacture than conventional shipping frames or pallets commonly used with lash boards.

As will be appreciated by one of ordinary skill in the art, it would be advantageous to provide components for a shipping or storage container which minimize if not eliminate the drawbacks of conventional lash boards and which provide a light-weight, reusable shipping or packing restraint.

SUMMARY OF THE INVENTION

A restraint of the invention includes a compressible, resilient layer, such as foamed polyethylene, and an abrasion-resistant layer, such as polyurethane. In the preferred practice of the invention, the restraint is a laminated article having a polyethylene inner surface and an opposed polyurethane outer surface. The restraint is particularly useful for packing and/or storing frangible items, such as glass sheets. In one particular embodiment, the restraint is shaped for mounting on an edge of stacked glass sheets. The inner surface(s) of this embodiment are comprised at least partly of a compressible material and the outer surface(s) are comprised at least partly of a material having a hardness greater than that of the compressible material.

A shipping container of the invention includes a base and a plurality of articles supported on the base as a unit or "stack". At least one restraint of the invention is positioned at spaced edges of the stacked articles. A fastening member biases the restraints against the stack to secure the stack on the container.

A method of loading articles for shipment in accordance with the invention includes the steps of providing a plurality of articles on a base to form a unit having at least two opposed edges, and placing at least one restraint of the invention at the two opposed edges. At least one fastening member is placed in contact with the restraints to secure the articles on the base as a unitized pack. In the instance when the articles are glass sheets, the sheets can be supported on edge on the base and held in the vertical position by a back wall secured to the base. A restraint is positioned on the edges of the stacked sheets spaced from the back wall. The fastening member biases the sheets against the back wall.

BRIEF DESCRIPTION OF THE DRAWINGS

A complete understanding of the invention will be obtained from the following description when taken in connection with the accompanying drawing figures, wherein like reference characters identify like parts throughout.

FIG. 1 is a plan view (not to scale) of a restraint according to the invention;

FIG. 2 is a perspective, end view (not to scale) of the restraint shown in FIG. 1;

FIG. 3 is a plan view (not to scale) of an alternative restraint of the invention;

DESCRIPTION OF THE PREFERRED EMBODIMENTS

Figure 4:
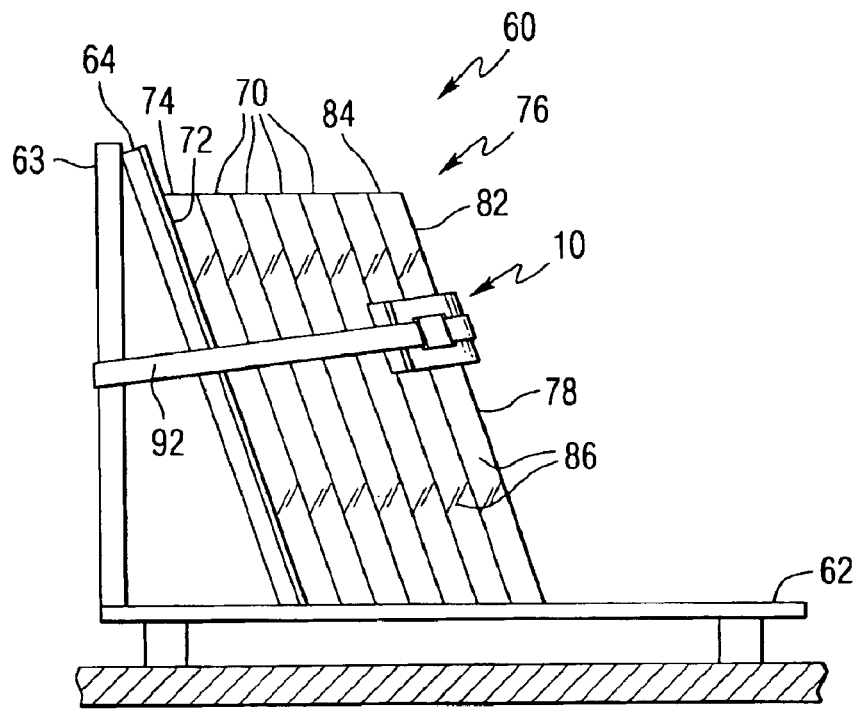
FIG. 4 is a side view (not to scale) of a plurality of articles secured in a shipping container utilizing restraints of the invention.

As used herein, spacial or directional terms such as "inner", "outer", "left", "right", "back", "front", and the like, relate to the invention as it is shown in the drawing figures. However, it is to be understood that the invention may assume various alternative orientations and step sequences without departing from the inventive concepts disclosed herein. Accordingly, such terms are not to be considered as limiting unless otherwise indicated. Further, as used herein, all numbers expressing dimensions, quantities of ingredients, physical characteristics, and so forth, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Moreover, all ranges disclosed herein are to be understood to include the beginning and ending range values and to encompass any and all subranges subsumed therein. For example, a range of "1 to 10" should be considered to specifically include any and all subranges between (and inclusive of) the minimum value of 1 and the maximum value of 10, e.g., 5.5 to 10. Also, as used herein, the terms "polymer" or "polymeric" include oligomers, homopolymers, and copolymers.

A first embodiment of a packaging restraint of the invention is generally designated 10 in FIGS. 1 and 2. In this embodiment, the restraint 10 is substantially "L" shaped having a first leg 12 joined to a second leg 14 at a region or vertex 16. As used herein, the term "vertex" refers to the general area or region located between, e.g., interconnected to, the two legs 12 and 14, e.g., the area or region of transition from one leg to the other. The restraint 10 includes a first (or inner) region or layer 20 of material having a first (or inner) surface 22 and a second (or outer) region or layer 24 of material having a second (or outer) surface 26. As used herein, the term "layer" refers to a general region or area of the restraint. The "layers" of the restraint can be made of different materials or can be different regions of the same material. Further, there may be no distinct interface between adjacent layers. Moreover, one or more additional regions or layers of the same or different materials can be located between the first layer 20 and second layer 24.

In the embodiment shown in FIGS. 1 and 2, the first layer 20 is continuous along the inner surface 22 and the inner surface 22 defines a substantially right angle Z centered around the vertex 16. In this embodiment, the outer surface 26 of the second layer 24 is rounded or curved at the vertex 16. As used herein when referring to the restraints of the invention, the terms "inner surface" or "inner layer" refer to a surface or layer configured to face one or more of the articles being shipped and the terms "outer surface" or "outer layer" refer to a surface or layer facing away from or spaced farther away from the shipped articles, i.e., the "inner surface" will be closer to the articles than the "outer surface". As will be described in more detail below, the outer surface 26 can be configured to engage a fastening element, such as a banding strap. In one embodiment, the inner surface 22 is configured to contact one or more of the shipped articles.

In one embodiment, the first layer 20 is made at least partly of a flexible material, e.g., a material that absorbs shock, is compressible, and is resilient, i.e., returns substantially to its original shape and size after being compressed. Examples of materials suitable for the first layer 20 include natural or synthetic elastic, elastomeric, or flexible materials, such as cork, rubber, or polymeric materials, such as but not limited to inorganic or organic (whether natural or synthetic) polymers, thermoplastic materials, or thermoset materials. Suitable polymeric materials include polybutene, polybutadiene, polycarbonate, neoprene, polyisoprene, polyvinyl chloride, polystyrene, polypropylene, polyurethane, polyesters, polyalkanes, polyalkenes, and polyethylene, e.g., foamed polyethylene, or mixtures or laminates thereof. The first layer 20, if exposed to a cutting edge, can have a thickness sufficient to absorb shock during the shipping process without having the articles being shipped rubbing or cutting through the first layer 20. In one embodiment, the first Layer 20 is formed by foamed polyethylene having a minimum thickness "M" at the vertex 16 of about 0.25 to 1 inch (0.6 to 2.5 cm), e.g., about 0.5 inch (1.3 cm). In this embodiment, the foamed polyethylene has a density of about 3 pounds to 9 pounds (1.3 to 4 kg), e.g., about 6 pounds (2.7 kg). As will be appreciated by one of ordinary skill in the art, the "density" of a foamed polymer, such as polyethylene, refers to the pressure applied during forming of the foamed polymer, e.g., a foamed polyethylene having a density of 3 pounds (1.3 kg) means that the foamed polyethylene was formed under a pressure of 3 pounds per square inch (0.2 kg/sq. meter). As a general rule, as the density of the material (e.g., polyethylene) forming the first layer 20 increases, the overall thickness of the first layer 20 can be decreased. However, the density of the polyethylene preferably should not be below a density at which the polyethylene has insufficient shock absorbing qualities for the articles being secured. For example, the density of the polyethylene can generally be lower for metal articles than for frangible articles, such as glass sheets.

The second layer 24 preferably has a hardness greater than that of the first layer 20. As used herein, the term "hardness" refers to the ability of a material to resist penetration or abrasion. Non-limiting examples of suitable materials for the second layer 24 include metal, wood, polymeric materials (such as those discussed above), or mixtures or laminates thereof. In one embodiment, the second layer 24 is polyurethane. When the material of the second layer 24 is a foamed polymeric material, the foamed polymeric material of the second layer 24 preferably has a density greater than the density of the material of the first layer 20. The second layer 24 should be sufficiently abrasion-resistant to protect the first layer 20 from damage or abrasion during shipping and/or storage and to withstand contact by a fastening member, such as a banding strap, without the banding strap cutting through or severely damaging the second layer 24. As shown in FIG. 1, the second layer 24 can be substantially continuous along the outer surface 26 of each leg 12 and 14 and can have a curved surface at the vertex 16.

An attachment member 36 can be located on the outer surface 26 of at least one of the legs 12 or 14. As will be described below, the attachment member 36 is configured to engage, e.g., releasably engage, a fastening member, such as a banding strap. In one embodiment, the attachment member 36 is formed by a body 38 extending outwardly from the outer surface 26 and includes a longitudinal slot 40 through which a banding strap can be passed. However, other configurations, such as a pair of spaced, parallel walls extending from the outer surface 26; a conventional buckle; a friction clip; and the like could also be used to engage, secure, and/or guide the fastening member.

As will be appreciated by one of ordinary skill in the art, the embodiment of the restraint 10 of the invention described above can be formed in many ways. For example, the first layer 20 and second layer 24 can be separately formed and then laminated together, such as through a conventional adhesive (glue) or by mechanical means (such as Velcro, clamps, pegs, or screws extending into or through the layers 20, 24, just to name a few). Alternatively, the restraint 10 can be formed by a conventional molding process in which the polymeric, e.g., polyethylene, material of the inner layer 20 is contacted with the polymeric, e.g., polyurethane, material of the outer layer 24 when the polyurethane material is warm, e.g., greater than or equal to about 20° C., to adhere or mold the two materials together to form the restraint 10. Alternatively, the materials of the layers 20 and 24 can be the same material, e.g., polyethylene, with the inner layer 20 having the same or a lower density than the outer layer 24.

In one embodiment, with reference to FIGS. 1 and 2 as needed, the restraint 10 has an inner length L for each leg of about 3 inches to about 10 inches (7.5 cm to 25 cm), e.g., about 5 inches (11 cm), an edge thickness E of the inner layer 20 (e.g., polyethylene) of about 0.25 inch to about 3 inches (0.6 cm to 7.5 cm), e.g., about 1.25 inches (3 cm), and an edge thickness F of the outer layer 24 (e.g., polyurethane) of about 0.1 inch to 2 inches 0.3 cm to 5 cm), e.g., about 0.25 inch (0.6 cm). The outer surface 26 for each leg can be about 3.5 to 4 inches (8.9 cm to 10 cm) wide (W). The attachment member 36 can extend a distance G of about 0.1 inch to 2 inches (0.3 cm to 5 cm), e.g., 0.25 inch (0.6 cm) from the outer surface 26 and can be about 1 inch to 2 inches (2.5 cm to 5 cm) long (H) and about 1 inch to 2 inches (2.5 cm to 5 cm) wide (I).

An alternative restraint 50 of the invention is shown in FIG. 3. This restraint 50 is similar to the restraint 10 described above and shown in FIGS. 1 and 2 but, in this embodiment, the inner or first layer 20 is divided into two separate or distinct regions 52 and 54, with one region located on each leg 12 and 14. A groove 56 can be formed at the vertex 16 of the restraint 50, such as on the inner side of the restraint 50.

Securing a plurality of articles to a conventional shipping container will now be described with particular reference to utilizing the restraint 10 described above. The restraint 50 could be utilized in a similar manner. For purposes of the following discussion, the articles being packaged will be referred to as flat glass sheets. However, the invention should not be considered as limited to securing flat articles and/or glass sheets. For example, the restraint 10 or 50 of the invention can be used to ship or store bent or flat articles, such as but not limited to bent or flat glass sheets, refractory glass, ceramics, coated or uncoated glass sheets, metal sheets, plywood, or for shipping or storing boxes or cartons. It is also to be understood that the invention is not limited to the size or number of articles shipped or the number of rows of articles in the container or to use with a particular type of shipping container.

Figure 5:
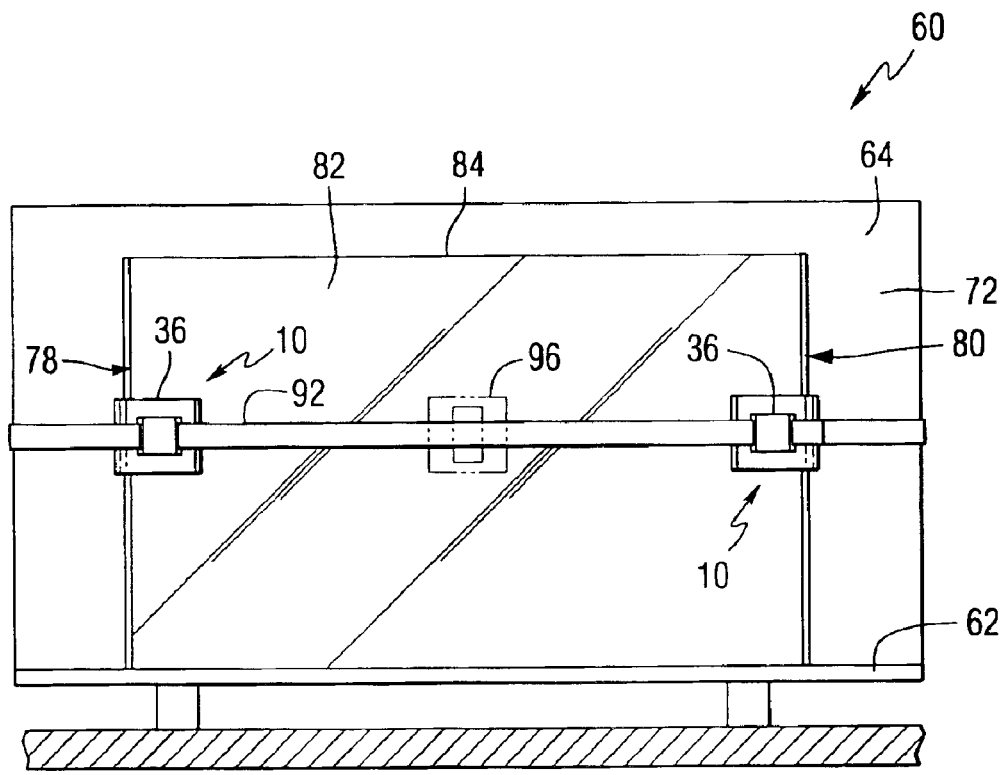
FIG. 5 is a front view (not to scale) of the shipping container of FIG. 4.

The restraint 10 can be utilized with conventional shipping containers, i.e., specially designed containers are not required. However, the invention can be practiced with specially designed containers as well. FIGS. 4 and 5 show a conventional shipping container 60 having a base 62 with a back wall 63 extending upwardly therefrom. The back wall 63 may be a solid wall or may be formed from a plurality of spaced stanchions attached to the base 62. A support 64, such as a sheet or one or more pieces of wood, metal, plastic, or a combination thereof, may be connected to the back wall 63, e.g., at the top of the back wall 63, and angled outwardly at the bottom, as shown in FIG. 4. However, it is to be understood that the invention is not limited for use with such containers 60.

In the practice of the invention, a plurality of individual articles, e.g., glass sheets 70, are placed on the base 62, e.g., placed on edge on the base 62. A pad or cushion 72 may be placed between the outer surface of the support 64 (i.e., the surface facing away from the back wall 63) and the inner surface (i.e., the surface facing the back wall 63) of the innermost glass sheet 74 to protect the inner surface of the innermost glass sheet 74 from mechanical damage due to contact with the support 64. It is to be understood that the invention is not limited to the size or number of rows of the articles, e.g., glass sheets 70, carried on or in the container 60. A single row of glass sheets 70 or a plurality of rows carried on the base 62 can be secured using the restraints 10 of the invention. Adjacent glass sheets 70 can be separated by an interleaver material, such as wood flour, or by cloths, spacers, etc., to prevent marring or scratching of the adjacent surfaces.

Figure 6:
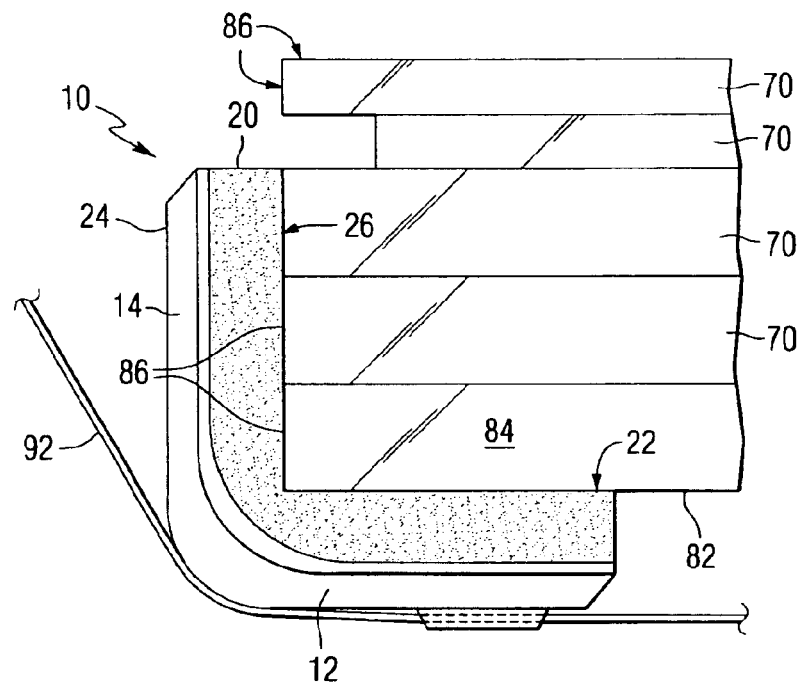
FIG. 6 is a plan, partial view (not to scale) of an outer corner region of the secured articles of FIG. 5.

The glass sheets 70, when placed adjacent one another, form a glass unit or stack 76 on the base 62. The glass stack 76 has a pair of outer edges 78 and 80 spaced from the support 64. When a desired number of glass sheets 70 are on the base 62, at least one restraint 10 of the invention can be placed at a position along each of the opposed outer edges 78 and 80 of the glass stack 76, as shown in FIG. 5. As shown in FIGS. 5 and 6, the restraint 10 can be placed such that the inner surface 22 of one of the legs, e.g., leg 12, extends at least partly along the outer face or outer major surface 82 of the outermost glass sheet 84 while the inner surface 26 of the other leg 14 extends along the outer ends 86 of at least a portion of the other glass sheets 70. Although not necessary, a shipping pad or cloth can be placed between the inner surfaces 22 of the legs 12 and 14 and the major surface 82 and/or the outer edges 86 of the glass sheets 70.

An elongate fastening or tension member, such as a cloth, plastic, or metal banding strap 92, is threaded through the slots 40 in the attachment members 36 of the restraints 10 and passed around the support 64. Tension is applied to the glass sheets 70 by tensioning the banding strap 92, such as by pulling on the free ends of the banding strap 92 behind the support 64 to urge the restraints 10 toward the outer edges 78 and 80 of the glass sheets 70 and, hence, to urge the glass sheets 70 together toward the support 64 to form a unitized stack. The ends of the banding strap 92 can then be connected together behind the support 64 in any conventional manner, such as by nails, screws, clamps, or other similar fasteners well known in the art, to secure the glass sheets 70 to the base 62, e.g., against the support 64. While in the above discussion only one restraint 10 is positioned along each of the outer edges 78 and 80, it is to be understood that two or more restraints 10 can be located at each edge 78 and 80 and secured by additional banding straps 92.

Utilization of the restraint 50 shown in FIG. 3 is similar to that described above but, in this case, one or more of the outer glass sheets 70, i.e., the glass sheets 70 farthest from the support 64, can extend into the groove 56.

Thus, the present invention provides a method and device for securing articles, particularly frangible sheets, for shipping or storage. The restraint of the invention decreases the overall weight of the loaded container compared to utilizing conventional lash boards while maintaining the articles securely in place. After the glass sheets 70 are unpacked from the container 60, for example by cutting or unfastening the banding strap 92, the restraints 10 can be stored or returned to the shipper.

As shown in FIG. 5, for long articles, e.g., glass sheets 70 having a length of greater than about 76 inches (193 cm), it may be desirable to place one or more optional intermediate restraints 96 between the restraints 10 on the edges 78 and 80. The intermediate restraint 96 can be a resilient block, e.g., a polyethylene block, to prevent the banding strap 92 from accidentally contacting the outer major surface 82 of the outermost glass sheet 84. Alternatively, the intermediate restraint 96 can incorporate features of the invention, e.g., a resilient inner material or layer and an abrasion resistant outer material or layer, which is capable of engaging the banding strap 92. For example, the intermediate restraint 96 can be configured in similar manner as the first leg 12 of the restraint 10 described above but without the second leg 14.

Figure 7:
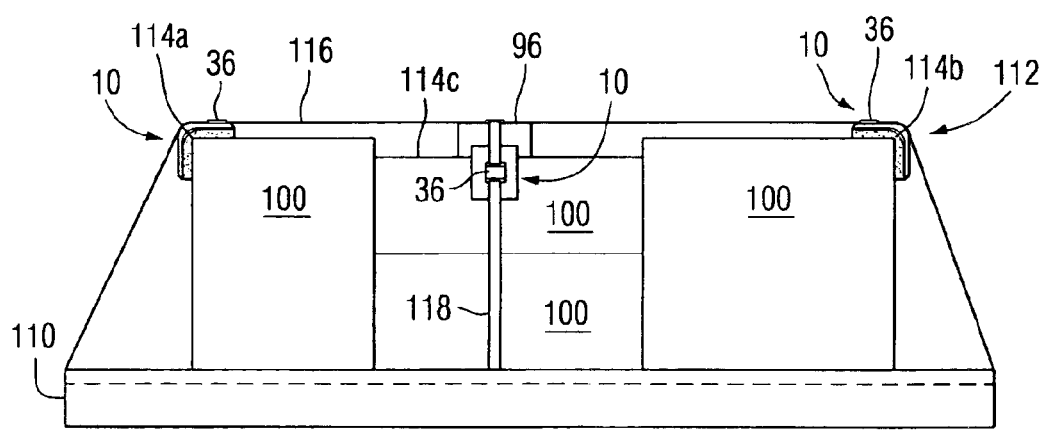
FIG. 7 is a side view (not to scale) of another shipping container utilizing restraints of the invention.

FIG. 7 shows the use of restraints 10 of the invention for securing a plurality of articles in the form of cartons 100 placed on a base or pallet 110. The cartons 100 are placed on the pallet 110 to form a unit 112 having at least two, and in the illustrated case four, top or outer edges spaced from the pallet 110. When a desired number of cartons 100 are placed on the pallet 110, a restraint 10 is placed at a position along at least two of the edges, e.g., intermediate along the left and right outer edges 114a and 114b shown in FIG. 7. The inner surface(s) 22 face the cartons 100 and the outer surface(s) 26 face away from the cartons 100. A fastening member, e.g., a banding strap 116, is threaded through the slots 40 in the attachment members 36 and can be passed around or through the pallet 110. The banding strap 116 can then be tensioned and secured in conventional manner. Another pair of restraints 10 can be placed along the front edge 114c and the back edge (not shown) in similar manner and tensioned as above with a banding strap 118 to secure the cartons 100 to the pallet 110. An intermediate restraint 96 as described above can be positioned to prevent the banding straps 116 and 118 from contacting the tops of the cartons 100. Although FIG. 7 shows only one restraint positioned along each edge 114a, 114b, 114c and the back edge (not shown), it is to be understood that a plurality of restraints 10 could be located along each of the edges and secured by additional banding straps.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

What is claimed is:

1. A laminated substantially L-shaped packing restraint, comprising:
    a first layer of a compressible, resilient material, the first layer having a major surface defined as first surface of the first layer and an opposite major surface defined as second surface of the first layer;
    a second layer of a compressible, resilient material, the second layer having a major surface defined as first surface of the second layer and an opposite major surface defined as second surface of the second layer;
    a substantially L-shaped layer of an abrasion-resistant material, the L-shaped layer having a major surface defined as first surface of the L-shaped layer and an opposite major surface defined as second surface of the L-shaped layer, wherein the L-shaped layer comprises a first leg and a second leg joined together at a vertex, wherein the vertex comprises a groove in the first surface of the L-shaped layer and the first layer is secured to the first surface of the first leg of the L-shaped layer and the second layer is secured to the first surface of the second leg of the L-shaped layer with the groove in the first surface of the L-shaped layer between the first, and second layers to provide the laminated substantially L-shaped packing restraint, and
    an attachment member on the second surface of the L-shaped layer.

2. The restraint according to claim 1, wherein the first layer and the second layer comprise at least one material selected from cork, rubber, foamed polymeric materials and non-foamed polymeric materials.

3. The restraint according to claim 2, wherein the polymeric materials are selected from the group consisting of polyethylene, polybutene, polybutadiene, polycarbonate, neoprene, polyisoprene, polyvinyl chloride, polystyrene, polypropylene, polyurethane, polyesters, polyalkanes, and polyalkenes.

4. The restraint according to claim 2, wherein at least one of the first and second layers comprises foamed polyethylene.

5. The restraint according to claim 1, wherein the L-shaped layer comprising at least one material selected from metal, wood, foamed polymeric materials and non-foamed polymeric materials.

6. The restraint according to claim 5, wherein the polymeric materials are selected from the group consisting of polyethylene, polybutene, polybutadiene, polycarbonate, neoprene, polyisoprene, polyvinyl chloride, polystyrene, polypropylene, polyurethane, polyesters, polyalkanes, and polyalkenes.

7. The restraint according to claim 6, wherein the L-shaped layer comprises polyurethane.

8. The restraint according to claim 1, wherein the L-shaped layer has a hardness greater than that of the first and second layers.

9. A restraint for packaging glass sheets, the restraint comprising:
    a unitary laminated member, comprising:
        an outer layer having a first member and a second member defining a vertex, the outer layer having a major surface defined as a first major surface and an opposite major surface defined as a second major surface, the second major surface of the outer layer comprising major surfaces of the first and second members;
        a first leg having a major surface defined as an inner surface configured to contact at least a portion of the glass sheets and an opposite major surface defined as an outer surface, the outer surface of the first leg bonded with the second major surface of the first member of the outer layer; a second leg having a major surface defined as an inner surface of the second leg configured to contact at least a portion of the glass sheets and an opposite major surface defined as an outer surface of the second leg, the outer surface of the second leg bonded with the second major surface of the second member of the outer layer, wherein the inner surfaces of the first and second legs each extend from the vertex of the outer layer along the second major surface of their respective member and are comprised at least partly of a compressible material, and the first major surface of the outer layer is comprised at least partly of a material having a hardness greater than that of the compressible material, and
        an attachment member formed on the first major surface of the outer layer.

10. The restraint according to claim 9, wherein the inner surfaces of the first and second legs comprise polyethylene.

11. The restraint according to claim 10, wherein the polyethylene is foamed polyethylene formed under a pressure of 3 to 9 pounds per square inch).

12. The restraint according to claim 9, wherein the first major surface of the outer layer comprises polyurethane.

13. The restraint according to claim 9 wherein the attachment member comprises a raised portion having a strap retainer portion.

14. The restraint according to claim 9 wherein the attachment member has side walls and a member joining the sidewalls to provide a passageway to receive banding to bias the restraint against the glass sheets and to limit lateral movement of the banding.

15. A laminated restraint for packaging glass sheets, the restraint comprising:
an outer layer having a first member and a second member defining a vertex, the outer layer having a major surface defined as a first major surface and an opposite major surface defined as a second major surface, the second major surface of the outer layer comprising major surfaces of the first and second members, wherein the vertex comprises a groove in the second surface of the outer layer;
a first leg having a major surface defined as an inner surface configured to contact at least a portion of the glass sheets and an opposite major surface defined as an outer surface, the outer surface of the first leg secured to the second major surface of the first member of the outer layer; a second leg having a major surface defined as an inner surface of the second leg configured to contact at least a portion of the glass sheets and an opposite major surface defined as an outer surface of the second leg, the outer surface of the second leg secured to the second major surface of the second member of the outer layer, wherein the inner surfaces of the first and second legs are comprised at least partly of a compressible material, and the first major surface of the outer layer is comprised at least partly of a material having a hardness greater than that of the compressible material, and adjacent ends of the first and second legs are spaced from one another, and
an attachment member formed on the first major surface of the outer layer.

16. The restraint according to claim 15, wherein the first and second legs are comprised of at least one material selected from cork, rubber, foamed polymeric materials and non-foamed polymeric materials.

17. The restraint according to claim 16, wherein the polymeric materials are selected from the group consisting of polyethylene, polybutene, polybutadiene, polycarbonate, neoprene, polyisoprene, polyvinyl chloride, polystyrene, polypropylene, polyurethane, polyesters, polyalkanes, and polyalkenes.

18. The restraint according to claim 16, wherein at least one of the first and second legs comprises foamed polyethylene.

19. The restraint according to claim 15, wherein the outer layer comprises at least one material selected from metal, wood, foamed polymeric materials and non-foamed polymeric materials.

20. The restraint according to claim 19, wherein the polymeric materials are selected from the group consisting of polyethylene, polybutene, polybutadiene, polycarbonate, neoprene, polyisoprene, polyvinyl chloride, polystyrene, polypropylene, polyurethane, polyesters, polyalkanes, and polyalkenes.

21. The restraint according to claim 19, wherein the outer layer comprises non-foamed polyurethane.

22. The restraint according to claim 15, wherein the outer layer has a hardness greater than that of the first and second legs.

23. The restraint according to claim 15, wherein the attachment member includes a slot.

24. A restraint for securing a plurality of articles, the restraint comprising:
a unitary laminated L-shaped member comprising:
an inner layer having a first end and an opposite second end, and a major surface, the inner layer comprising foamed polyethylene formed under a pressure of 3 pounds to 9 pounds per square inch;
an outer layer having a major surface defined as a first major surface and an opposite major surface defined as a second major surface, and a first end and an opposite second end, the major surface of the inner layer bonded with the first major surface of the outer layer with the first ends of the inner and outer layers aligned with one another and the second ends of the inner and outer layers aligned with one another, the outer layer comprising polyurethane and having a hardness greater than that of the inner layer; and
the second major surface of the outer layer formed to have at least one attachment member having a slot.

25. The restraint according to claim 24 wherein the attachment member has side walls and a member joining the sidewalls to provide the slot.

26. A shipping container, comprising:
a base;
a plurality of articles carried on the base and defining a unit having at least two opposed edges;
at least one unitary L-shaped laminated restraint located along the two opposed edges, the restraint comprising:
an outer layer having a first member and a second member defining a vertex, the outer layer having a major surface defined as a first major surface and an opposite major surface defined as a second major surface, the second major surface of the outer layer comprising major surfaces of the first and second members;
a first leg having a major surface defined as an inner surface configured to contact at least a portion of the articles and an opposite major surface defined as an outer surface, the outer surface of the first leg bonded with the second major surface of the first member of the outer layer;
a second leg having a major surface defined as an inner surface of the second leg configured to contact at least a portion of the articles and an opposite major surface defined as an outer surface of the second leg, the outer surface of the second leg bonded with the second major surface of the second member of the outer layer, wherein the first and second legs are in contact with one another at, and each extend from, the vertex and comprise a compressible, resilient material and the outer layer comprises an abrasion-resistant material; and
an attachment member on the first major surface of the outer layer, and
a fastening member engaging the attachment member to secure the articles in the container.

27. The container according to claim 26, wherein the articles are flat, frangible articles and further including a back wall secured to the base wherein edge of the articles is supported on the base with major surfaces of the articles facing the back wall and the fastening member biases the at least one laminated restraint and the articles toward the back wall.

28. The container according to claim 27, wherein the articles are flat glass sheets.

29. The restraint according to claim 26 wherein the attachment member has side walls and a member joining the sidewalls to provide a passageway to receive the fastening member and to limit lateral movement of the fastening member.

30. A packaging restraint, comprising:
an abrasive resistant plastic member having a first leg joined to a second leg at a vertex to provide the member with a generally L-shaped cross sectional configuration, the member having an inner surface and an outer surface, the inner surface of the member designated to be in facing relationship to articles to be restrained;

a layer of a compressible resilient material secured to portions of the inner surface of the member on each side of the vertex, and an attachment on the outer surface of the member.

31. The restraint according to claim 30, wherein the layer comprises at least one material selected from cork, rubber, foamed polymeric materials and non-foamed polymeric materials.

32. The restraint according to claim 31, wherein the polymeric materials are selected from the group consisting of polyethylene, polybutene, polybutadiene, polycarbonate, neoprene, polyisoprene, polyvinyl chloride, polystyrene, polypropylene, polyurethane, polyesters, polyalkanes, and polyalkenes.

33. The restraint according to claim 31, wherein the layer comprises foamed polyethylene.

34. The restraint according to claim 33, wherein the foamed polyethylene is formed under a pressure of 3 to 9 pounds per square inch.

35. The restraint according to claim 30, wherein the plastic member comprises at least one material selected from foamed polymeric materials and non-foamed polymeric materials.

36. The restraint according to claim 35, wherein the polymeric materials are selected from the group consisting of polyethylene, polybutene, polybutadiene, polycarbonate, neoprene, polyisoprene, polyvinyl chloride, polystyrene, polypropylene, polyurethane, polyesters, polyalkanes, and polyalkenes.

37. The restraint according to claim 35, wherein the plastic member comprises polyurethane.

38. The restraint according to claim 30, wherein the attachment member includes a pair of spaced sidewalls and a member joining the sidewalls to provide a slot to receive banding and to limit lateral movement of the banding.

39. The restraint according to claim 30 wherein the plastic member and the layer are secured to each other according to at least one of the following techniques (a) the plastic member and the layer are separately formed and then laminated together by an adhesive, (b) the plastic member and the layer are separately formed and then laminated together by mechanical fasteners, and (c) a molding process.

40. The restraint according to claim 39 wherein an adhesive secures the layer to the plastic member.

41. The packaging restraint according to claim 39 wherein a mechanical fastener secures the layer to the plastic member.

42. The restraint according to claim 39 wherein the layer and the plastic member are molded together.

43. The restraint according to claim 30 wherein the layer of compressible material extends to the end of the first leg and to the end of the second leg.

* * * * *